United States Patent
Maekawa

(10) Patent No.: US 8,139,223 B2
(45) Date of Patent: Mar. 20, 2012

(54) TRANSMISSION OPTICAL SYSTEM

(75) Inventor: Satoshi Maekawa, Tokyo (JP)

(73) Assignee: National Institute of Information and Communications Technology, Koganei-shi (JP)

( * ) Notice: Subject to any disclaimer, the term of this patent is extended or adjusted under 35 U.S.C. 154(b) by 152 days.

(21) Appl. No.: 12/593,973

(22) PCT Filed: Mar. 28, 2008

(86) PCT No.: PCT/JP2008/056244
§ 371 (c)(1),
(2), (4) Date: Sep. 30, 2009

(87) PCT Pub. No.: WO2008/123473
PCT Pub. Date: Oct. 16, 2008

(65) Prior Publication Data
US 2010/0128271 A1    May 27, 2010

(30) Foreign Application Priority Data

Mar. 30, 2007    (JP) .................................. 2007-091787

(51) Int. Cl.
*G01N 21/00* (2006.01)
(52) U.S. Cl. ........................................ 356/435; 356/432
(58) Field of Classification Search .......... 356/432–438; 359/642, 618–627
See application file for complete search history.

(56) References Cited

U.S. PATENT DOCUMENTS
2002/0044349 A1   4/2002   Shinoura
2004/0085643 A1   5/2004   Ishikawa et al.
2004/0263964 A1   12/2004  Okano et al.

FOREIGN PATENT DOCUMENTS
| JP | 7-294827 A | 11/1995 |
| JP | 2001-356299 A | 12/2001 |
| JP | 2003-075946 A | 3/2003 |
| JP | 2004-151645 A | 5/2004 |
| JP | 2005-010755 A | 1/2005 |
| JP | 2009-025776 A | 2/2009 |
| WO | 2006/061959 A1 | 6/2006 |
| WO | 2007/116639 A1 | 10/2007 |

OTHER PUBLICATIONS

International Search Report for PCT/JP2008/056244, mailing date of Jun. 17, 2009.
S Maekawa et al., "Transmissive Mirror Device with Micro Dihedral Reflector Array", ITE Technical Report, Oct. 18, 2006, pp. 49-52, vol. 30, No. 52.
S Maekawa et al., "Transmissive Optical Imaging Device with Micromirror Array", Proc. of SPIE, Oct. 2006, pp. 63920E-1-63920E-8, vol. 6392.

*Primary Examiner* — Tri T Ton
(74) *Attorney, Agent, or Firm* — Westerman, Hattori, Daniels & Adrian, LLP

(57) ABSTRACT

A transmission optical system includes a plurality of imaging optical systems arranged apart from each other, forming successively the image of an object to be projected so a real image of either a two-dimensional or a three-dimensional object can be observed at the opposite end, with its convexity features either identical to or reversed from the projected object, depending on whether the total number of the imaging optical systems is even or odd.

7 Claims, 15 Drawing Sheets

(a)

(b)

(a)

(b)

TRANSMISSION OPTICAL SYSTEM

FIELD OF THE INVENTION

The present invention is related to a transmission optical system, that is, to an optical device that achieves transmitting to a separate location and forming there the image of an object to be projected by an imaging optical system, as well as that is capable to form the image of a three-dimensional object or a three-dimensional displayed image reversed in the depth direction, or alternately without reversing it in the depth direction.

BACKGROUND OF THE INVENTION

Among optical systems using existing optical devices (such as convex lenses) in order to form the image of an object and then to transfer the image to a separate location and form there another image, for instance the relay lens system might be mentioned as a representative example (see for example Non-Patent Reference No. 1). In case of the relay lens system, it is customary to choose a configuration where in addition to the objective lens facing the object to be projected, several other lenses are also included and arranged to form further images of the object to be projected, so that the image might be observed in a location separated from the object to be projected and from the objective lens, and this principle is used for instance as rigid scopes for endoscopes (see for instance Non-Patent Reference No. 2).

Furthermore, imaging optical devices have been proposed comprising of a symmetry surface forming a plane (optical device plane) such that light paths of light passing through the plane are bent, with the property that the formed image will be reversed in the depth direction with respect to the plane. It is known that by the proper arrangement such imaging optical systems are capable of forming real mirror images, in which case they are capable of forming not only two-dimensional images but also three-dimensional images without distortion. One example of the above-mentioned imaging optical systems is the afocal lens array (see Patent Reference No. 2) making use of the refraction of light, by using optical devices with infinite focal distance, that is afocal devices, as unit optical elements.

Another imaging optical system as proposed by the present inventor makes use of the effect of reflection of light by specular surfaces, by arranging one or more specular surfaces perpendicularly or nearly perpendicularly to the optical device plane to serve as unit optical elements reflecting light (dihedral corner reflectors) thus forming a dihedral corner reflector array (see Patent Reference No. 1). The dihedral corner reflector array has the property that light emitted from an object to be projected (including objects with physical reality and displayed images) that is placed to one side of the optical device plane, will be transmitted through the dihedral corner reflector array by being reflected by each specular surface of the unit optical elements, thus forming a real image of the object to be projected in the space on the other side of the optical device plane.

Still another imaging optical device proposed by the present inventor comprises of a retroreflector with recursive reflecting capability, and a half-mirror (see Patent Reference No. 3). The above-mentioned imaging optical device operates by recursively reflecting light emitted by the object to be projected and reflected by the half-mirror, then passing the light through the half-mirror; or alternately, by recursively reflecting light emitted by the object to be projected and passed through the half-mirror, then reflecting the light by the half-mirror; in either case, the half-mirror surface functioning as the plane of symmetry, whereby a mirror image of the object to be projected is formed as a real image at a planar symmetric position without distortion; therefore similarly to a dihedral corner reflector array making it possible to observe two-dimensional real images in case the object to be projected is two-dimensional, or three-dimensional real images in case the object to be projected is three-dimensional, from an oblique direction.

Patent Reference No. 1: WO2007/116639
Patent Reference No. 2: JP 2005-10755
Patent Reference No. 3: JP 2009-025776
Non-Patent Reference No. 1: "Colum-5 relay lens" ("Colum-5 rire-renzu"), by Shin-Ichi Nagata, in: "Understand Lenses Illustrated" ("Zukan renzu ga wakaru hon"), Nippon Jitsugyo Shuppansha Co., Ltd., Nov. 20, 2002, p. 118 (in Japanese)
Non-Patent Reference No. 2: "IV. Optical Devices" ("IV. Kougaku kiki"), by Shin-Ichi Nagata, in: "Latest Optical Technology Handbook" ("Saishin kougaku gijutsu handobukku"), Asakura Shoten Co., Ltd., Sep. 29, 2002, pp. 830-831 (in Japanese)

SUMMARY OF THE INVENTION

Problems to be Solved by the Invention

In the above-mentioned relay lens system, the image formed by the objective lens is transferred through several other lenses before arriving at the lens at the other end (for instance at the eyepiece) where the finally formed image becomes visible as an optical image; thus for example as compared with fiber endoscopes, higher image quality can be achieved. However, since in case of the relay lens system transmission of the image becomes possible due to each lens having a common optical axis, it has the problem that there will be more strict physical constraints on the observation point of the image as compared with the fiber endoscope, which transfers the image formed at the objective lens through a large number of optical fibers using total internal reflection. Furthermore, in such relay lens systems even if the object to be projected is three-dimensional, due to effects like aberration in practice it will be observable only as a two-dimensional image.

In light of the above, the goal of the present invention is to provide a new imaging optical system by using an imaging optical device having a symmetry surface forming a plane such that light paths of light passing through that plane are bent, with the property that the formed image will be reversed in the depth direction with respect to that plane, it becomes possible to project the real image of the object to be projected to a far away location, with having a relatively universal choice in selecting that location, and with the additional capability to obtain three-dimensional real images of the object to be projected.

Means for Solving the Problems

The transmission optical system of the present invention has a plurality of imaging optical systems equipped with a symmetry surface forming a plane such that light paths of light passing through that plane are bent, with the property that the image of an object to be projected that is placed to one side of that symmetry surface will be formed at the opposite side as a real image reversed in the depth direction with respect to that surface, and those imaging optical systems being arranged with distances among them. Furthermore the imaging optical system closest to the object to be projected will project that object through its symmetry surface and form its image, then each other imaging optical system will project the image formed by its neighbor optical system on its side closer to the object to be projected through its symmetry surface and form its image.

In case of the above transmission optical system, in each imaging optical system the light emitted by the object to be projected (a physical object, or an image displayed by a display device, either two-dimensional or three-dimensional) that is placed to one side of the transmission optical system will be bent as it is transmitted through the symmetry surface and will form an image on the opposite side of the symmetry surface. In other words, by using the transmission optical system of the present invention, the imaging optical system located closest to the object to be projected will form an image of the object to be projected on the opposite side of its symmetry surface from the object to be projected; thereupon that image will become the object to be projected for the adjacent imaging optical system so that it will form its image on the opposite side of its symmetry surface; and by such an iterative process of imaging it becomes possible to project the image of the object to be projected to a distant location separated from the original object to be projected and from the imaging optical system facing it, according to the total number of imaging optical systems.

For the imaging optical system used in the transmission optical system of the present invention, an imaging optical system might be used that is provided with a plurality of unit optical elements, each having at least one specular surface, capable of reflecting light, and placed perpendicularly or nearly perpendicularly to the optical device plane that is operating as the symmetry surface. In that case, it is possible to bend sharply the light at the optical device plane by making use of specular reflection, thus it becomes possible to form an image at a large angle with respect to the normal of optical device plane. In particular, mutually perpendicular pairs of specular surfaces, that is, dihedral corner reflectors can be used as the unit optical elements, and a plurality of such dihedral corner reflector forming a dihedral corner reflector array can be used as the imaging optical system. In that case, at each imaging optical device the light emitted from the object to be projected (or from the real image formed by the adjacent imaging optical device) will be reflected once on each of the two specular surfaces of each dihedral corner reflector for a total of two reflections, and the imaging optical system becomes a real image forming optical system that forms a real image of the object to be projected at a planar symmetric position with respect to the symmetry surface. In that case, albeit there will be a reversal in the depth direction, it becomes possible to form images of three-dimensional objects without distortions.

Furthermore, for the imaging optical system used in the transmission optical system of the present invention, an imaging optical system might be used that is provided with a half-mirror having a half-mirror surface that will become the symmetry surface, and of a retroreflective device formed from a set of retro-reflector elements arranged at the position of recursive reflection of the light transmitted or reflected by the half-mirror. The retroreflective device might be placed on the same side of the half-mirror surface as the object to be projected or on the opposite side, or it might be placed on both sides. When the retroreflective device is placed on the same side of the half-mirror surface as the object to be projected, the light emitted from the object to be projected and reflected from the half-mirror surface will be recursively reflected from the retroreflective device, then transmitted through the half-mirror, forming an image. On the other hand, when the retroreflective device is placed on the opposite side of the half-mirror surface from the object to be projected, the light emitted from the object to be projected and transmitted through the half-mirror surface will be recursively reflected from the retroreflective device, then reflected from the half-mirror, forming an image.

Furthermore, for the imaging optical system used in the transmission optical system of the present invention, an imaging optical system might be used that is provided with an afocal lens array, that is, a plurality of unit optical elements that are afocal optical devices making use of refraction, arranged along the optical device plane that is operating as the symmetry surface. In that case, insofar as the angle of refraction of the light cannot be made too large, imaging will be restricted to directions approximately orthogonal to the optical device plane. Considering the incident light side and the exit side, by making the center point the focus point, the real image of the object to be projected will be formed at a planar symmetric position with respect to the optical device plane, making it a real mirror imaging optical system, and in this case although with reversal in the depth direction, distortion-free images of three-dimensional objects can be obtained.

For such transmission optical systems of the present invention, it is possible to use the same kind of imaging optical system for all of its imaging optical systems, or it is also possible to select several different imaging optical systems from among the above-mentioned alternatives.

For the transmission optical system of the present invention, in case the above-mentioned several imaging optical systems are arranged in such a way so that all of their symmetry surfaces are positioned parallel to each other, the observed final image of the object to be projected can be formed on the perpendicular line common to all of those symmetry surfaces of the imaging optical systems. Therefore such an arrangement can be used to transfer the image of the object to be projected along a straight line.

On the other hand, if the several imaging optical systems are arranged in such a way so that at least one pair of adjacent imaging optical systems are not positioned parallel to each other, there will no longer exist a perpendicular line common to all of the symmetry surfaces of the imaging optical systems, and therefore such an arrangement might be used when it is desired to transfer the image of the object to be projected shifted in a nonlinear manner.

Furthermore, if the several imaging optical systems are arranged in such a way so that the symmetry surface of at least one imaging optical system is positioned at an angle with respect to the symmetry surface of the adjacent imaging optical system, it becomes possible to achieve a relatively high level of flexibility in the positioning of the projected image.

In particular, by making the number of the imaging optical systems used as components of the transmission optical system an even number, it becomes possible to observe the image formed by the imaging optical system most distant from the object to be projected without depthwise reversal, showing the same shape like the object to be projected. In contrast, by making the number of the imaging optical systems used as components of the transmission optical system an odd number, the image formed by the imaging optical system most distant from the object to be projected will be observed in a reversed shape in the depth direction as compared with the object to be projected.

Effects Achieved by the Invention

When using the transmission optical system of the present invention, since it will be possible to transfer the image of the object to be projected through several imaging optical systems, it becomes possible to observe without distortion the image of the object to be projected in a distant location, separated from the object to be projected, irrespectively of whether that object to be projected is two-dimensional or three-dimensional. Furthermore, by the appropriate arrangement of the positions of the several imaging optical systems, the projected position of the real image that is ultimately observed can be modified relatively freely. Moreover, by making the total number of the imaging optical systems an odd number, the real image of the object to be projected will be obtained with its shape reversed in the depth direction, while by making that number an even number, a real image without depth reversal will be formed, thus by using a larger number a non-reversed real image can be obtained, and by selecting even or odd numbers of the imaging optical systems, it is possible to change how the observed image is viewed. Furthermore, in case the imaging optical system is constructed as a real mirror imaging optical system, in both cases the image of three-dimensional objects will be free from distortions. Thus such a transmission optical system according to the present invention makes it possible to provide a new observation method of real images for remotely viewing three-dimensional objects using only passive optical elements, and it can be used for instance to apply it for such practical applications like three-dimensional endoscopy.

DETAILED DESCRIPTION OF THE INVENTION

Hereinafter, preferred embodiments of the present invention are described below with reference to the drawings.

First Embodiment

Figure 1:
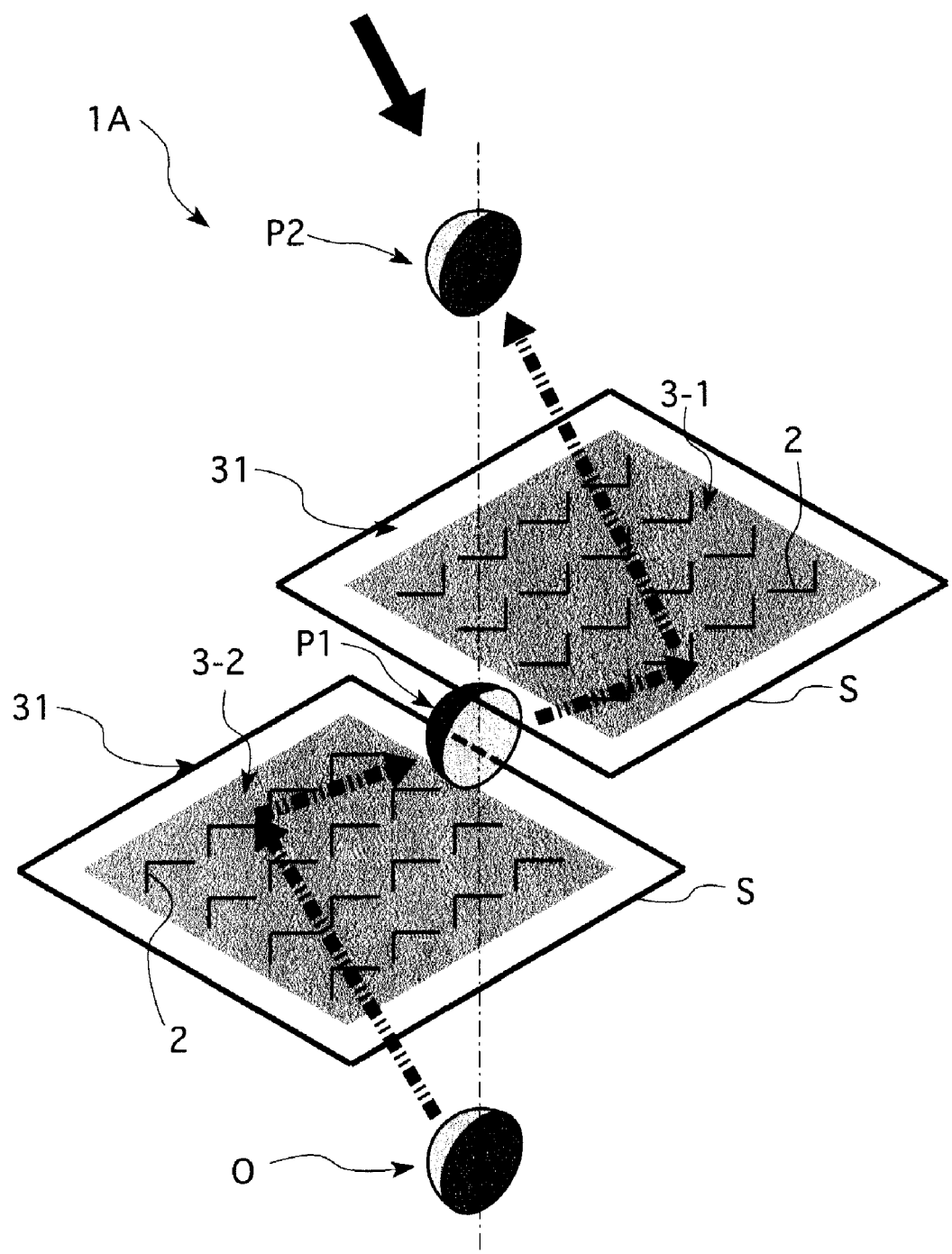
FIG. 1 is a perspective drawing of the basic structure of the transmission optical system of the first embodiment of the present invention.

The first embodiment of the present invention shown in FIG. 1 is one basic configuration of the transmission optical system of the present invention. The transmission optical system 1A of the present embodiment uses two instances (in the drawing denoted by 3-1 and 3-2) of the real mirror imaging optical system 3 (hereafter called 'dihedral corner reflector array') having a plurality of dihedral corner reflectors, thus constructed in such a way as to form a real image P2 having the same depthwise shape (convexity and concavity) like the object to be projected O. The above-mentioned two dihedral corner reflector arrays 3-1 and 3-2 are practically equivalent to each other. As shown in that drawing, in this transmission optical system 1A, the two dihedral corner reflector arrays 3 are arranged so that their optical device planes both denoted by S are parallel to each other. Since the dihedral corner reflector 2 is extremely small compared with the whole of the dihedral corner reflector array 3, in FIG. 1 the whole set of the dihedral corner reflectors 2 is indicated by grey shading, and the direction of its internal angle is indicated enlargedly in an exaggerated manner by a V mark; furthermore, the viewing direction of the real image P is indicated by an arrow.

The object to be projected O might be chosen to be any of the following: an (effectively) two-dimensional object such as an image drawn on paper; a three-dimensional object; or a two-dimensional or three-dimensional displayed image. In case the object to be projected O does not have itself light emitting capability, then lighting fixtures (not shown in the drawing) might be placed in appropriate locations in order to illuminate it. On the other hand, in the case when the object to be projected O is a displayed image, screens or displays (not shown in the drawing) might be placed in appropriate locations and if necessary, in order to project images on the screens or displays, projector devices or computers might be connected. In the drawing for the object to be projected O a three-dimensional partial spherical object somewhat smaller than a hemisphere is employed.

Figure 2:
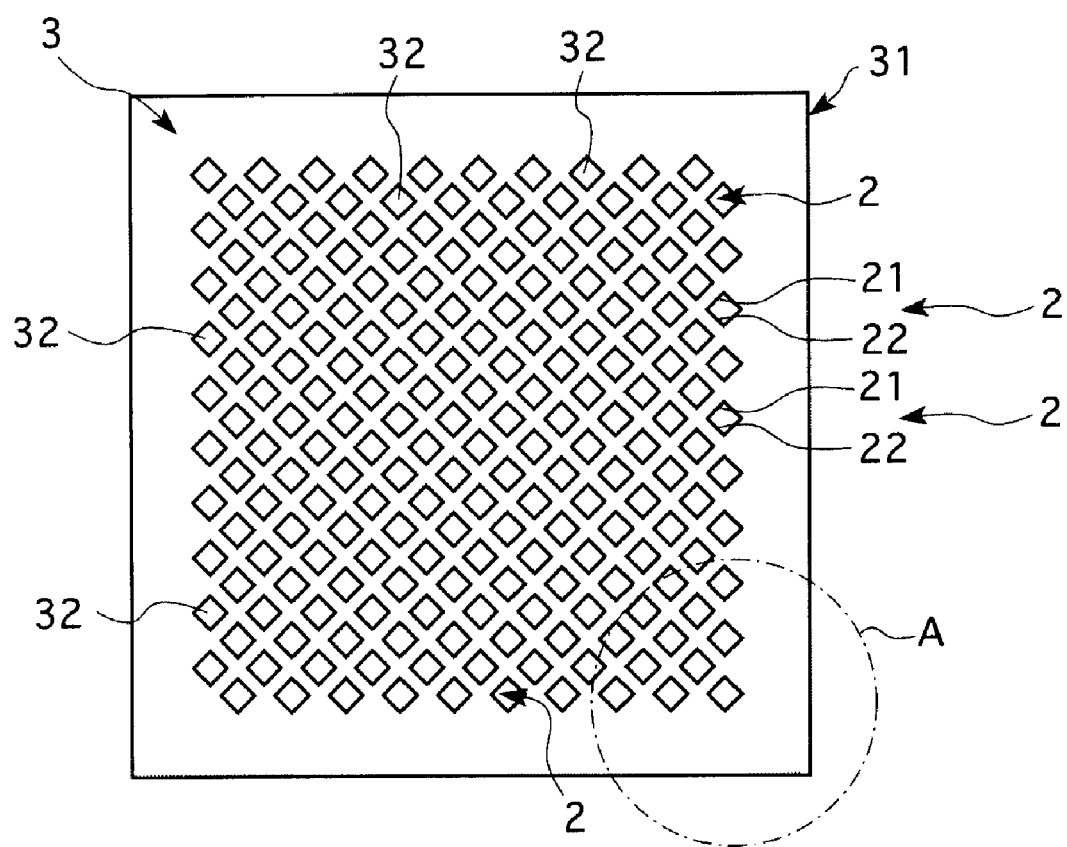
FIG. 2 is a plane drawing of a dihedral corner reflector that is one example of the imaging optical systems applicable for the first embodiment of the present invention.

First, the dihedral corner reflector array 3 as shown in FIG. 2 is constructed by preparing a plurality of holes 32 penetrating perpendicularly the flat surface of a substrate 31 in the thickness direction, and equipping two mutually perpendicular inner walls of each of those holes with two specular surfaces 21 and 22, in order to render each of the holes 32 into a dihedral corner reflector 2.

The substrate 31 has the form of a thin slab with a thickness between 50 to 200 um; in the present embodiment it is set to 100 um thickness; while in the present embodiment we use a flat square shape with each side having the same dimension of 5 cm, the thickness and lateral dimensions of substrate 31 are not restricted to the above-mentioned dimensions, but might be chosen appropriately as desired.

Figure 3:
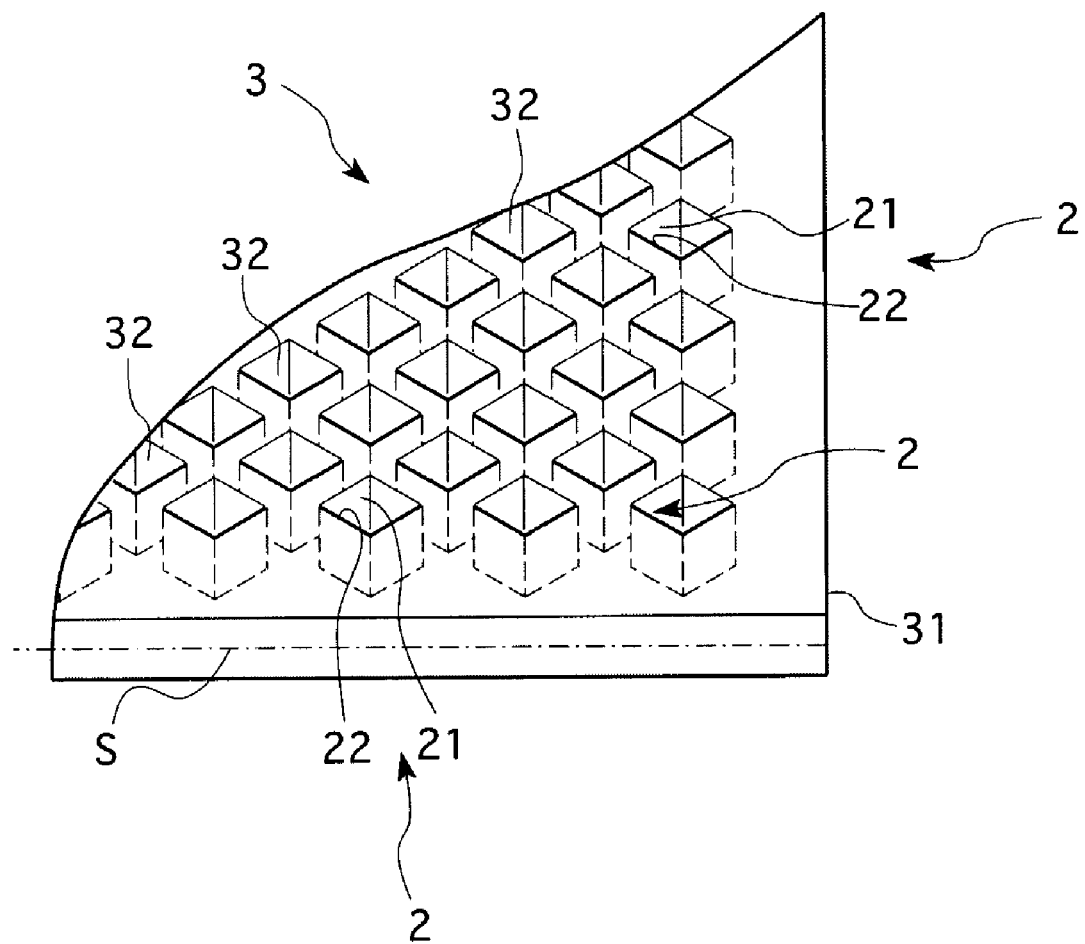
FIG. 3 is an enlarged perspective drawing of one portion of the dihedral corner reflector applicable for the first embodiment of the present invention.

As shown in detail A of FIG. 2, shown enlarged in FIG. 3, each dihedral corner reflector 2 is created by preparing physical and optical holes penetrating substrate 31 in order to allow light to be transmitted. In the present embodiment, firstly a plurality of rectangular (concretely in the present example, square) holes 32 are prepared across substrate 31; then for each of those holes 32 a pair of adjacent inner walls are prepared with flat mirror finish into specular surfaces 21 and 22; thus the specular surfaces 21 and 22 serving as the dihedral corner reflectors 2. It is preferable for other parts of hole 32 besides those used for the dihedral corner reflector 2 to be processed into non-reflecting surfaces instead of preparing them with mirror finish, or to tilt them, or use other methods in order to avoid multiple reflections. Each dihedral corner reflector 2 is made in such a way so that the direction of the inner angle enclosed by the specular surfaces 21 and 22 along substrate 31 points in the same direction. Hereafter the direction of the angle between those specular surfaces 21 and 22 shall be called the direction (aspect) of the dihedral corner reflector array 3. Regarding the manufacturing of specular surfaces 21 and 22, in the present embodiment firstly a metal mold is prepared, then the inner walls for the specular surfaces 21 and 22 are processed by nanoscale cutting into mirror surfaces, with a surface roughness not exceeding 10 nm, to serve as uniform specular surfaces for the entire band of the visible spectrum.

In concrete terms, the specular surfaces 21 and 22 of each dihedral corner reflector 2 might have a side length of 50 to 200 um, in case of the present embodiment they are set to 100 um to match the thickness of substrate 31; after the above-mentioned metal mold has been manufactured it is used in a nanoscale pressing process called nano-imprint process or in an electroforming process, so that in a single substrate 21 a plurality of the dihedral corner reflectors 2 shall be formed with a certain pitch. In the present embodiment each side of the dihedral corner reflectors 2 of the dihedral corner reflector array 3, the sides forming a V shape along the optical device plane S, is arranged at 45 degrees with respect to the width and depth of substrate 31, and all of the dihedral corner reflectors 2 are located along the grid points of an imaginary mesh laid on the optical device plane S facing in the same direction. By making the distance between two adjacent dihedral corner reflector 2 as small as possible, the light transmittivity of can be improved. Furthermore, those regions of the substrate 31 without dihedral corner reflectors 2 are treated with light absorbing coating, and thin transparent reinforcing plates, not shown in the drawing, are placed on the top and bottom surfaces of substrate 31. In the present embodiment a dihedral corner reflector array 3 with several tens or hundreds of thousands of dihedral corner reflectors 2 is employed.

In case substrate 31 is manufactured by electroforming from metals like aluminum, nickel, or such, when the surface roughness of the specular surfaces 21 and 22 on the mold is sufficiently low, they become naturally mirror surfaces. On the other hand, if substrate 31 is manufactured from plastic or such using nano-imprint technology, it might be necessary to prepare mirror surface coatings by sputtering or such in order to create the specular surfaces 21 and 22.

When dihedral corner reflectors 2 are created along substrate 31 in the above-mentioned manner, they shall have the property that light entering a hole 32 from the bottom (or top) side of substrate 31 shall be reflected from one of the specular surfaces (21 or 22), then that reflected light shall be once more reflected by the other specular surface (22 or 21), thus passing through to the top (or bottom) side of substrate 31; when viewing from the side the path of that light, the entrance light path and the exit light path will be planar symmetric with respect to the substrate 31 (optical device plane S) between them, therefore by preparing in the above-mentioned manner a multitude of dihedral corner reflectors 2 along substrate 31, they will behave as a dihedral corner reflector array 3. Therefore the optical device plane S (assuming a plane passing through the center of substrate 31 in its thickness direction, perpendicularly to each specular surface, indicated by an imaginary line in the drawing) shall be a plane across which the floating real image P (see FIG. 1) of the object to be projected O that is placed to one side of substrate 31 shall be formed on the other side in a planar symmetric position.

Figure 4:
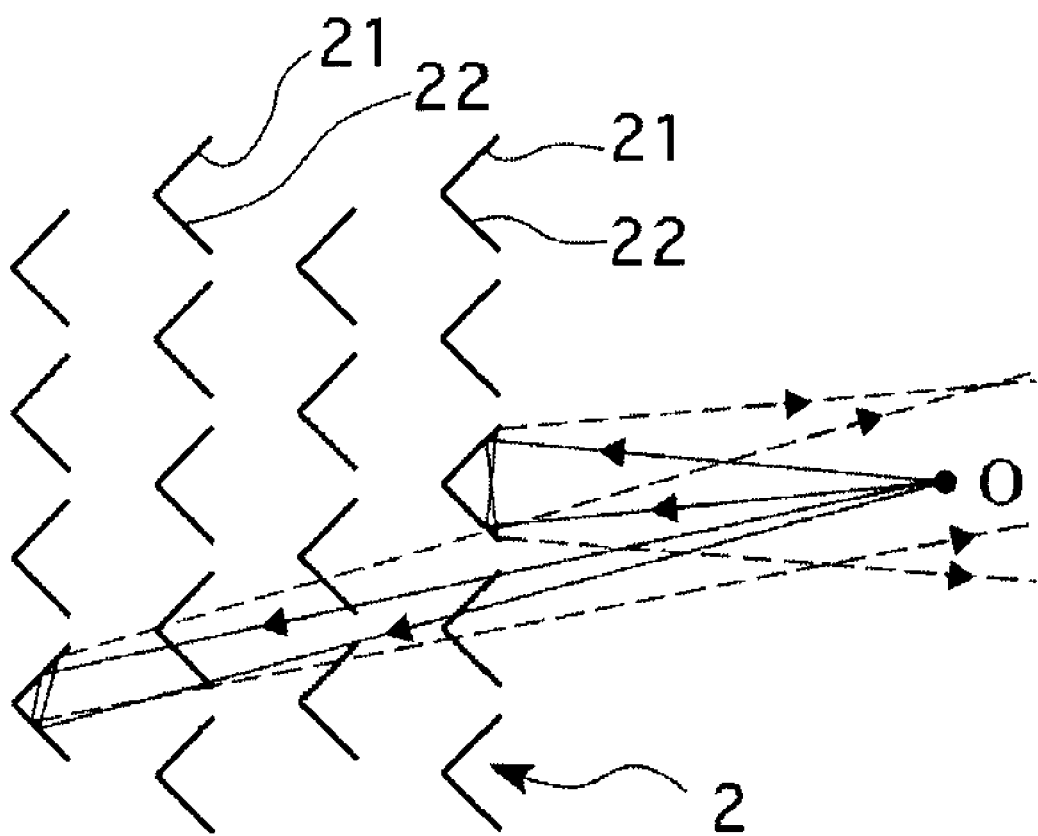
FIG. 4 is a plane drawing showing schematically the imaging process of the dihedral corner reflector applicable for the first embodiment of the present invention.
Figure 5:
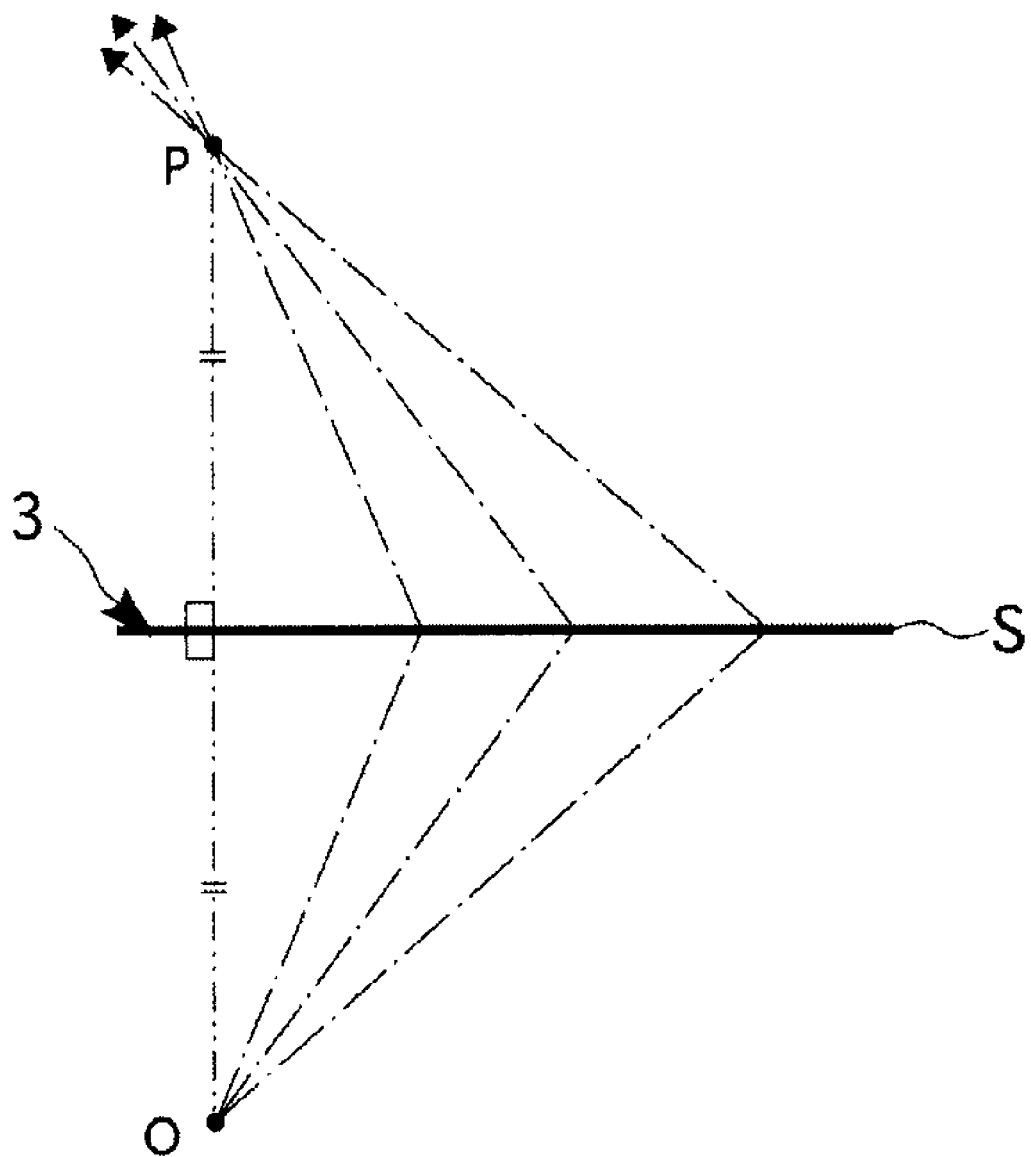
FIG. 5 is a side view drawing showing schematically the imaging process of the dihedral corner reflector applicable for the first embodiment of the present invention.
Figure 6:
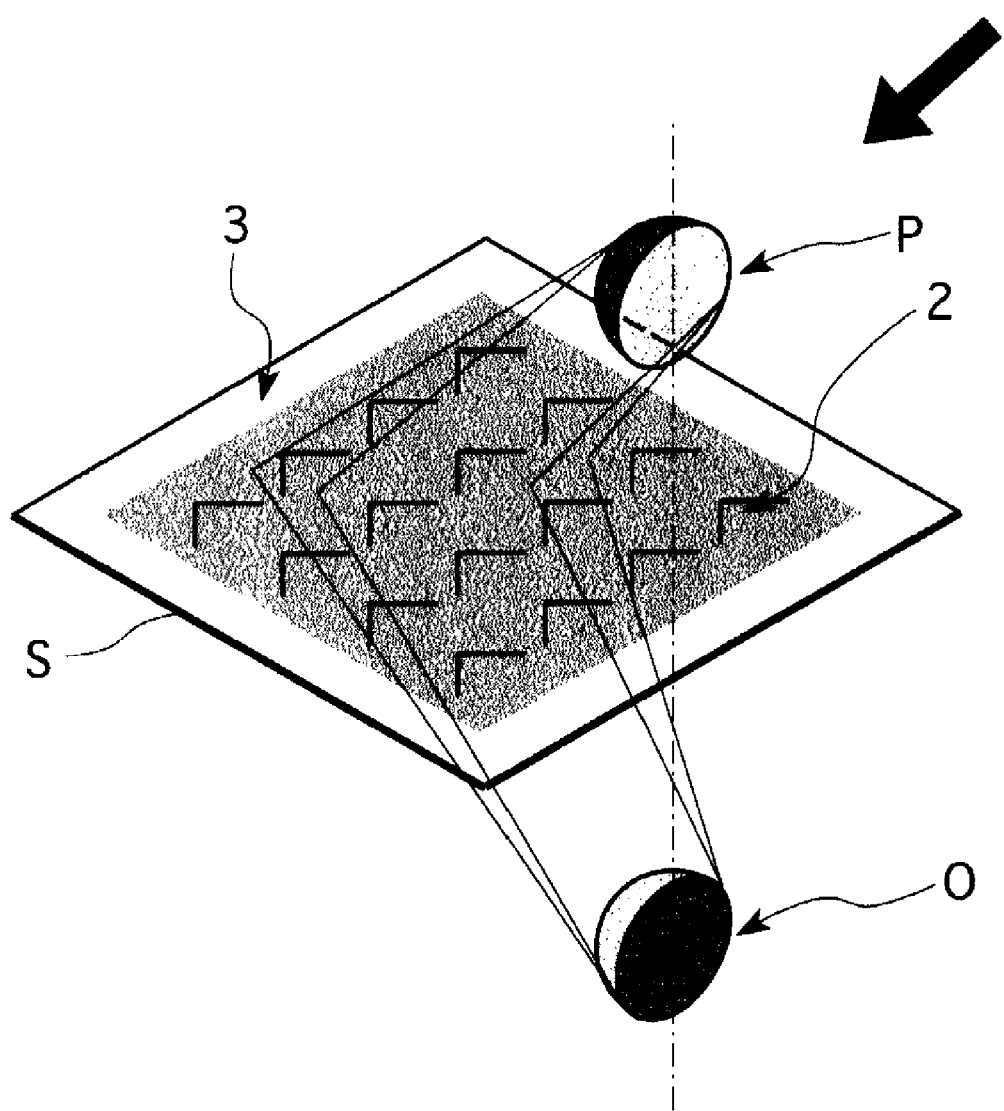
FIG. 6 is a perspective drawing showing schematically the imaging process of the dihedral corner reflector applicable for the first embodiment of the present invention.

Hereafter the process of imaging by a dihedral corner reflector array 3 of the present embodiment shall be explained together with the light path of lights emitted from the object to be projected O. As shown in a plane drawing in FIG. 4 and in a side view drawing in FIG. 5, light (in the direction of the arrow, indicated by solid line; in FIG. 4, in a three-dimensional sense passing from the space behind the paper to the space above it) emitted from the object to be projected O (indicated by a point in the drawings) as passing through the hole 32 prepared in the substrate 3 for the dihedral corner reflector array 3, shall be reflected once from one specular surface 21 (or 22) forming the dihedral corner reflector 2, then again reflected (reflected light paths indicated by broken lines) from the other specular surface 22 (or 21), therefore in a planar symmetric position to the object to be projected O with respect to the optical device plane S of the above dihedral corner reflector array 3, will form the real image P of the object to be projected O. It should be noted that while in FIG. 4 the entering and exiting light paths are shown parallel to each other, this happens due to the dihedral corner reflector 2 being shown in said drawing at an exaggerated size compared with the object to be projected O; in reality, each dihedral corner reflector 2 has extremely small size, therefore when the dihedral corner reflector array 3 is seen from above similarly to said drawing, the entering and exiting light paths will nearly overlap each other. Effectively, transmitted light will converge at a point in a planar symmetric position from the object to be projected O with respect to the optical device plane S, thus in FIG. 5 at position P1 a real mirror image shall be formed. The real image P as shown in FIG. 6 will be observable from oblique directions (the direction of the arrow in the drawing) from above the substrate 31, in such positions where the specular surfaces 21 and 22 of the dihedral corner reflectors 2 of the dihedral corner reflector array 3 are visible. More specifically, as light is reflected by two mutually perpendicular specular surfaces 21 and 22, among the components of the light direction, the component that is parallel to the surface of substrate 31 (in other words, the component that is parallel to the optical device plane 3S) shall return in the direction from where it came, whereas the component that is parallel to the surface of the specular surfaces 21 and 22 shall be preserved as it was. As a result, light passing through the dihedral corner reflector array 3 with two reflections shall always pass through a point in a planar symmetric position with respect to the optical device plane S. Therefore as light is being emitted in every direction from the object to be projected O as a light source, insofar as those light rays are reflected twice by the dihedral corner reflectors 2 while passing through the dihedral corner reflector array 3, all of them will converge in the same point making it a focus point. As explained above, light passing through the dihedral corner reflector array 3 while being reflected twice shall be focused to a planar symmetric point, therefore focus points will be possible in a wide range along the depth direction (in the direction perpendicular to the optical device plane S). Thus when a three-dimensional object or a three-dimensional image is placed in the space under the substrate 31 as the object to be projected O, a real image P1 will appear floating above the substrate 31, but that real image P1 is reversed in the depth direction, that is for the concave and convex features, as compared with the object to be projected O. In the drawing, the reversed status of the concave and convex features of the real image P1 as compared with the object to be projected O is indicated by the difference in the shading (the depth of the color) according to the direction of the lighting for the object to be projected O and the real image P1 (similarly in FIG. 1).

As explained above, the transmission optical system 1A of the present invention has two dihedral corner reflector array 3-1 and 3-2 arranged with their optical device planes S parallel to each other with some distance between them (see FIG. 1). However, the two dihedral corner reflector array 3-1 and 3-2 are arranged in such a way so that the internal angle of the dihedral corner reflectors 2 of the dihedral corner reflector array 3-1 the internal angle of the dihedral corner reflectors 2 of the dihedral corner reflector array 3-2 are facing each other when viewed from above. First, the light emitted from the object to be projected O while being transmitted through the dihedral corner reflector array 3-1 (the first dihedral corner reflector array) that is closer to the object to be projected O, will be reflected for a total of two times on its dihedral corner reflectors 2, thereby forming an image at a planar symmetric position with respect to the optical device plane S (real image P1). As mentioned above, the convex and concave features of this real image P1 will be reversed as compared with the convex and concave features of the object to be projected O. The distance of the two dihedral corner reflector arrays 3-1 and 3-2 is set to such a value so the position where the real image P1 is formed will be between the first dihedral corner reflector array 3-1 and the next dihedral corner reflector array (the second dihedral corner reflector array) 3-2. Next, the light emitted from that real image P1, while being transmitted through the second dihedral corner reflector array 3-2 will be reflected for a total of two times on its dihedral corner reflectors 2, thereby forming an image at a planar symmetric position with respect to the optical device plane S (real image P2). Since the convex and concave features of this real image P2 will be reversed as compared with the convex and concave features of the real image P1, they will be identical with those of the object to be projected O. Therefore it becomes possible to observe a real image P2 with its convex and concave features not being reversed from those of the object to be projected O.

Figure 7:
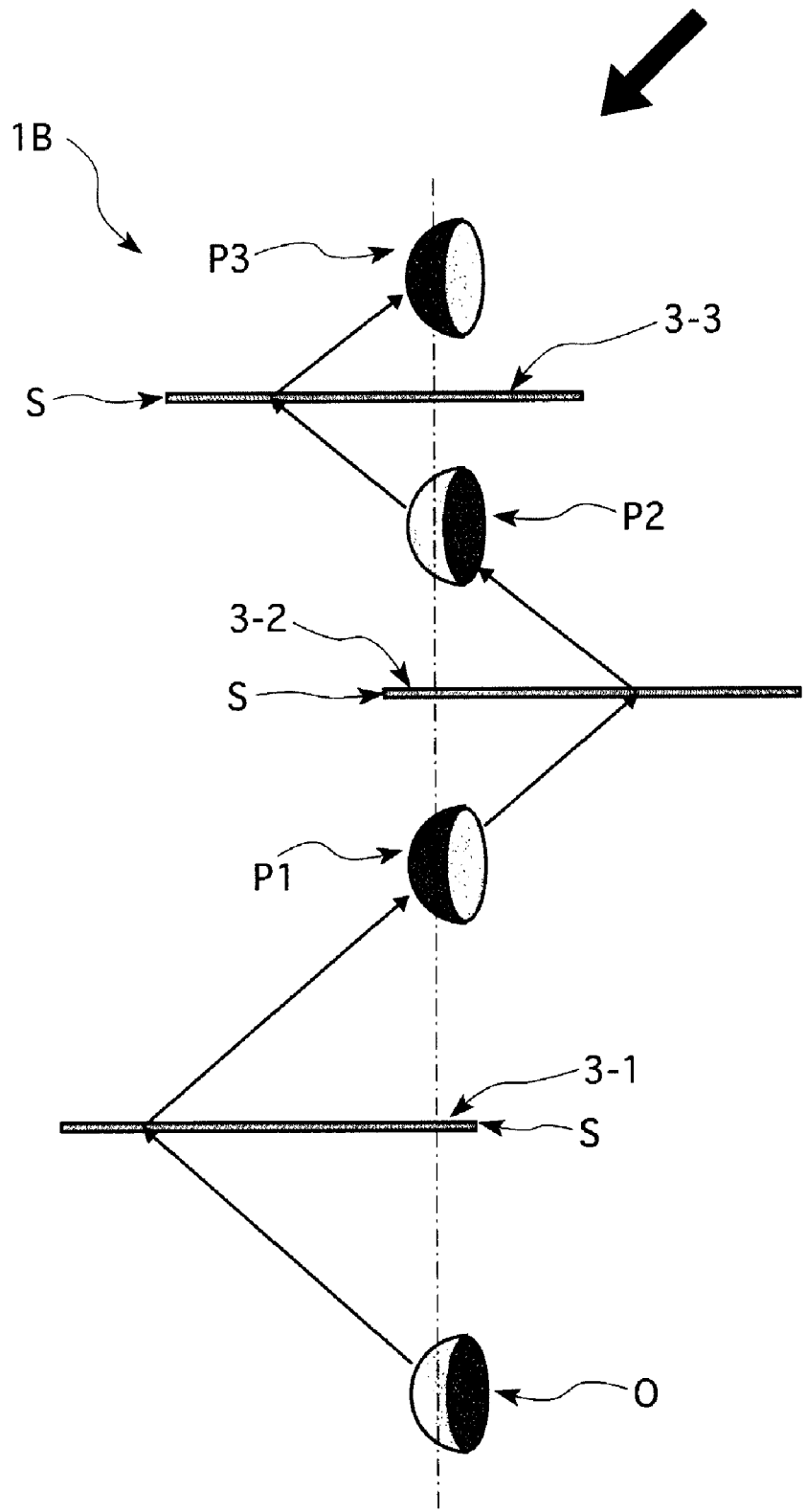
FIG. 7 is a side view drawing showing the principle of the transmission optical system of another configuration of the first embodiment of the present invention.

Hereafter as a variant of the above-mentioned transmission optical system 1A, the transmission optical system 1B consisting of three dihedral corner reflector arrays 3 arranged parallel to each other, as shown in FIG. 7, shall be explained. In this case, by placing a third dihedral corner reflector array 3-3 on the opposite side of the second dihedral corner reflector array 3-2 from the object to be projected O, with its dihedral corner reflectors 2 facing in the same direction like those of the first dihedral corner reflector array 3-1, it becomes possible to form the real image P3 in a planar symmetric position from the real image P2 with respect to the optical device plane S of the third dihedral corner reflector array 3-3, with its convex and concave features reversed as compared with the object to be projected O (that is, identical to the convex and concave features of the real image P1). Similarly, by adding a fourth, fifth, and so forth, dihedral corner reflector array 3 placed parallel, the real image P of the object to be projected O might be spatially translated on and on along a straight line; however, when the total number of the dihedral corner reflector arrays 3 is an even number, the observed real image P will have its convex and concave features identical to the convex and concave features of the object to be projected O, while when that number is odd, the observed real image P will have its convex and concave features reversed as compared with the convex and concave features of the object to be projected O.

Second Embodiment

Figure 8:
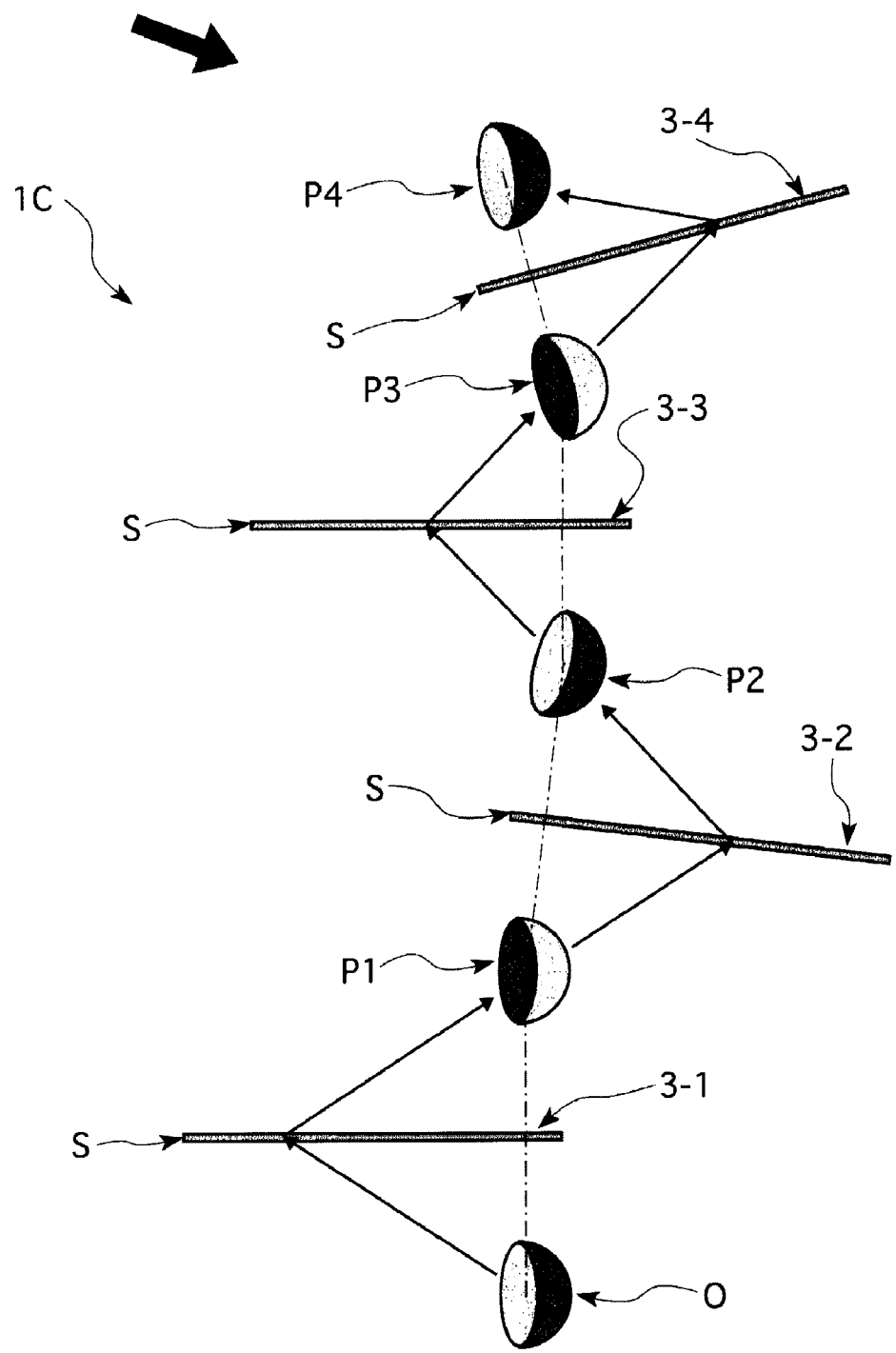
FIG. 8 is a side view drawing showing the principle of the transmission optical system of the second embodiment of the present invention.

The transmission optical system 1C shown in FIG. 8 as a side view drawing is the second embodiment of the present invention, whereas a plurality of dihedral corner reflector arrays 3 equivalent to those used in the first embodiment are arranged in such a way so that the two optical device planes S and S of adjacent dihedral corner reflector arrays 3 are not parallel to each other. In concrete terms, in the transmission optical system 1C of the drawing, starting from the object to be projected O, four dihedral corner reflector arrays 3-1, 3-2, 3-3, and 3-4 are arranged in sequence with some distance between each other, so that the two optical device planes S and S of each of the pairs of the first dihedral corner reflector array 3-1 and the second dihedral corner reflector array 3-2, the second dihedral corner reflector array 3-2 and the third dihedral corner reflector array 3-3, the third dihedral corner reflector array 3-3 and the fourth dihedral corner reflector array 3-4, are placed in a tilted attitude with respect to each other. Here the image forming process of each dihedral corner reflector array 3 is according to the explanation given for the first embodiment.

In case of that transmission optical system 3C, first the light emitted from the object to be projected O forms an image due to the first dihedral corner reflector array 3-1 in a planar symmetric position with respect to its optical device plane S, giving rise to a real image P1 having its convex and concave features reversed. Next, this real image P1 is projected by the second dihedral corner reflector array 3-2 to a planar symmetric position with respect to its optical device plane S, reversing its convex and concave features, and thus giving rise to a real image P2 having convex and concave features identical to the object to be projected O. Further on, this real image P2 is projected by the third dihedral corner reflector array 3-3 to a planar symmetric position with respect to its optical device plane S, again reversing its convex and concave features, and thus giving rise to a real image P3 having convex and concave features reversed. Finally, this real image P3 is projected by the fourth dihedral corner reflector array 3-4 to a planar symmetric position with respect to its optical device plane S, still again reversing its convex and concave features, giving rise to a real image P4 having convex and concave features identical to the object to be projected O, which real image P4 will be observed.

As seen from the drawing, the object to be projected O and the real images P1, P2, P3, and P4 are positioned one by one along a non-linear path. This means that by the appropriate selection of the angles between adjacent dihedral corner reflector arrays 3 (or rather their optical device planes S) it becomes possible to observe the real image P4 with a relatively high degree of freedom. In particular, by incorporating an angle adjusting means, by which the attitude of each dihedral corner reflector array 3, that is, its angle with respect to adjacent dihedral corner reflector arrays can be adjusted, it becomes possible to achieve a still higher degree of freedom in observing the real image P4. In that case, it might happen that two adjacent dihedral corner reflector arrays become parallel to each other, so if by chance or design it occurs that all dihedral corner reflector arrays 3 become parallel, a transmission optical system equivalent to the first embodiment is achieved.

It should be noted that in case of the present embodiment too, the number of the dihedral corner reflector arrays 3, as far as there are at least two, might be adjusted as desired. In particular, as the number of dihedral corner reflector arrays 3 is increasing, the position of the eventually observed real image might be set freely. Furthermore, when the total number of the dihedral corner reflector arrays 3 is an even number, the observed real image P will have its convex and concave features identical to the convex and concave features of the object to be projected O, while when that number is odd, the observed real image P will have its convex and concave features reversed as compared with the convex and concave features of the object to be projected O, like in the case of the first embodiment.

In light of the preceding, as for the transmission optical system of the present invention including the preferred embodiments above, by making use of its capability to form a three-dimensional real image of a three-dimensional object at a spatially removed location, it becomes suitable for applications in optical devices like endoscopes.

Figure 9:
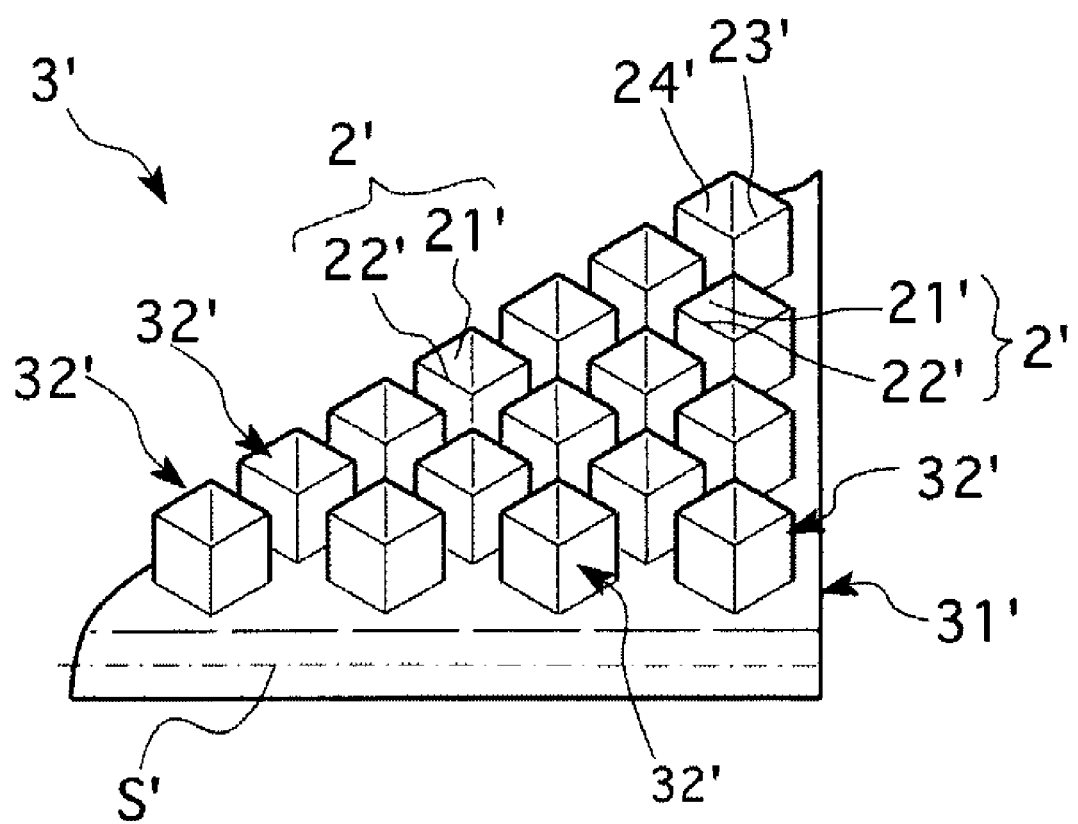
FIG. 9 is a perspective drawing of another configuration of a dihedral corner reflector applicable for the second embodiment of the present invention.

We note that the exemplary embodiments enumerated above are not restricted to the examples shown here. In order to realize the dihedral corner reflectors 2 constituting a dihedral corner reflector array 3, it is enough to have two mutually perpendicular specular surfaces; thus for such specular surfaces a plane of a reflecting material with mirror-grade finish or with mirror coating might be used, or the boundary between two transparent materials with different refracting indices that cause total internal reflection and having mirror-grade surface quality might also be used. More concretely, in the above-mentioned embodiments, for the dihedral corner reflector array 3, as an example the dihedral corner reflectors 2 were realized by creating optical holes by square holes penetrating the thin slab shaped substrate 31, and equipping two adjacent inner walls of the holes with specular surfaces 21 and 22; however, as an alternative to the above-mentioned configuration, as shown in FIG. 9, transparent tubular bodies jutting out from the surface of substrate 31' in its thickness direction might be used to realize the unit optical elements 2', and by arranging a multitude of the tubular bodies in a rectangular mesh pattern, a dihedral corner reflector array 3' might be realized. In that case, the mutually perpendicular first inner surface and second inner surface can serve as the specular surfaces 21' and 22', thus constituting the dihedral corner reflector 2'. In that case, similarly to the case of the preceding embodiments, the light being reflected twice by the dihedral corner reflector 2' passes through a planar symmetric point with respect to the surface of the substrate 31', that is, to the optical device plane S'; thus in a suitable spatial region not only two-dimensional but also three-dimensional images can be formed. Furthermore, by making the walls of the tubular bodies other than those used for surfaces 21' and 22', that is the walls 23' and 24' into non-reflecting surfaces, or equipping them with a non-perpendicular tilting angle with respect to the optical device plane 3S', unwanted reflections can be prevented, resulting in a clearer image. Furthermore, the two specular surfaces 21' and 22' constituting the dihedral corner reflector 2' might use total internal reflection, or alternately they might be processed with mirror coating. In particular, when the specular surfaces 21' and 22' operate by the principle of total internal reflection, insofar as total internal reflection has a critical angle, it can be expected that multiple reflections will be less likely to occur. Furthermore, by equipping the surfaces of the tubular bodies that are to be used as specular surfaces with metallic mirror coatings, adjacent tubular bodies might be bonded together. In that case it becomes necessary to equip the other surfaces besides the specular surfaces with some non-reflecting coating; however, the aperture ratio will be improved, resulting in a dihedral corner reflector array with excellent light transmission properties.

Furthermore, as for the two specular surfaces constituting the dihedral corner reflectors 2, so far as two mutually perpendicular mirror surfaces can be prepared, it is not necessary for them to touch each other, but might be arranged with a gap between them; furthermore, in case of the aforementioned holes or tubular bodies, there is no constraint on the angle between the two specular surfaces constituting the dihedral corner reflectors and the other surfaces. For the unit optical elements, shapes having planar projections of other polygons besides rectangles, or triangles, or shapes where the external ends of the two specular surfaces are connected with a shape having an approximately circular arc as a planar projection, or such, might also be used. It should be noted that using a shape with planar projection of a right triangle as the unit optical elements means using a right prism for the unit optical elements.

Third Embodiment

Figure 10:
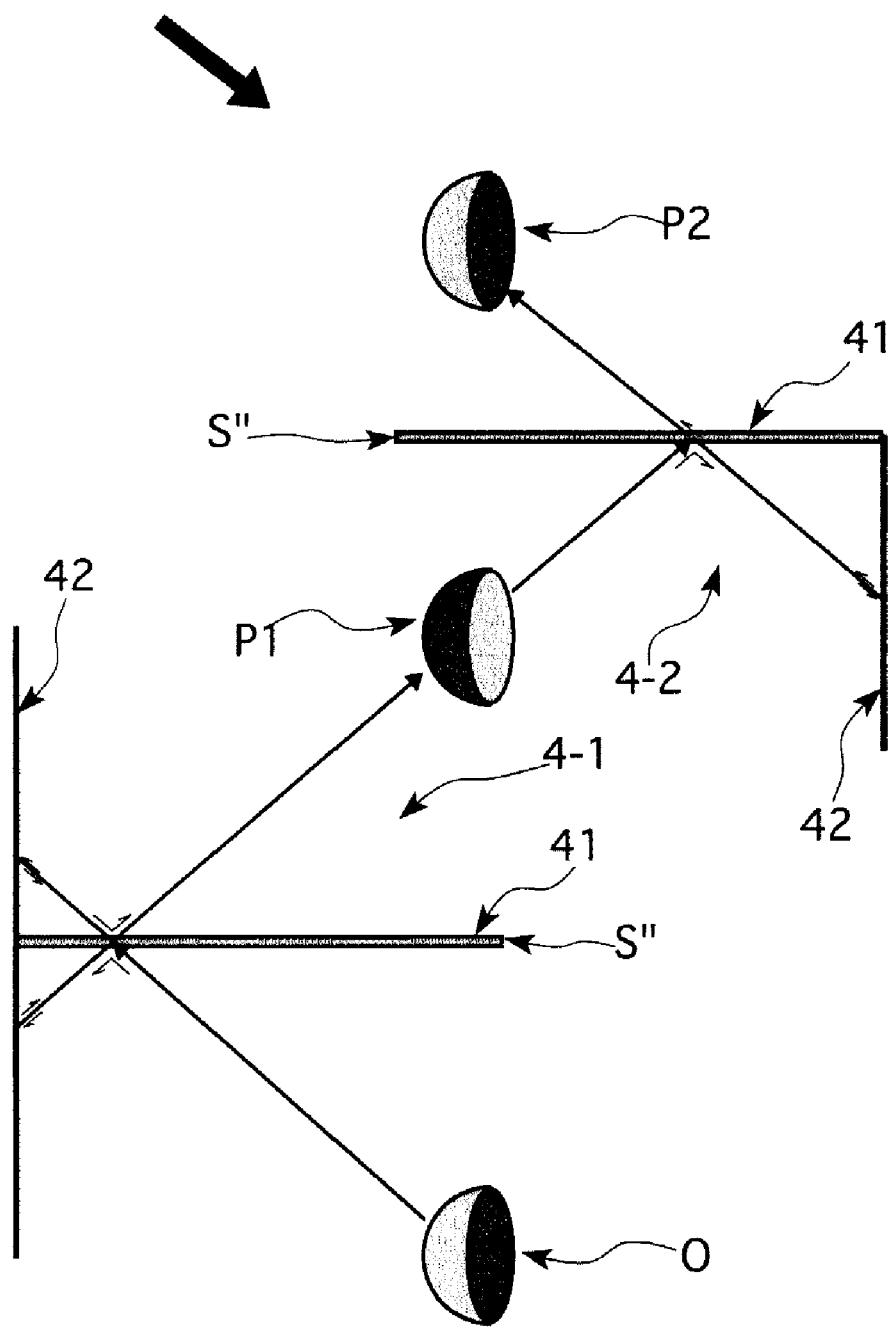
FIG. 10 is a side view drawing showing the principle of the transmission optical system of the third embodiment of the present invention.

The transmission optical system 1D shown in FIG. 10 as a side view drawing is the third embodiment of the present invention, whereas two real mirror imaging optical systems 4 (denoted by 4-1 and 4-2) are used, each consisting of a half-mirror 41 and a recursively reflective optical device (hereafter called 'retroreflector array') 42, thus constructed in such a way as to form a real image P2 having the same depthwise shape (convexity and concavity) like the object to be projected O. Hereafter the same symbols will be used in the explanation for the object to be projected O and the real images (P1 and P2) like those used for the preceding embodiments.

For the half-mirror 41 a transparent thin board made of transparent plastic or glass or such, with thin reflective coating on one of its sides, might be used. In case of the half-mirror board 41, the half-mirror surface S" that both reflects and transmits light serves as the symmetry surface for the transmission optical system 1D of the present embodiment. By processing the surface of this transparent thin board opposite to the reflecting surface with an anti-reflective coating (AR coating), it is possible to prevent forming a duplex real image P.

Figure 11:
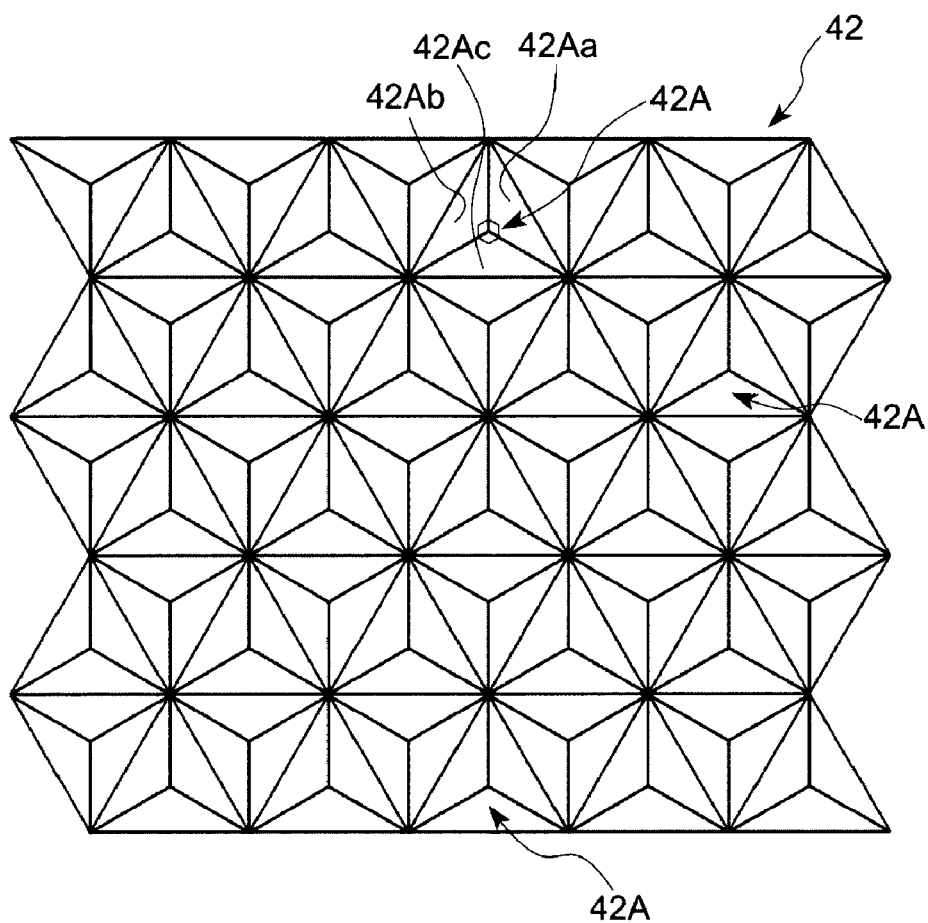
FIG. 11 is a drawing showing schematically one configuration of the retroreflector array of the real mirror imaging optical system applicable for the third embodiment of the present invention.
Figure 11:
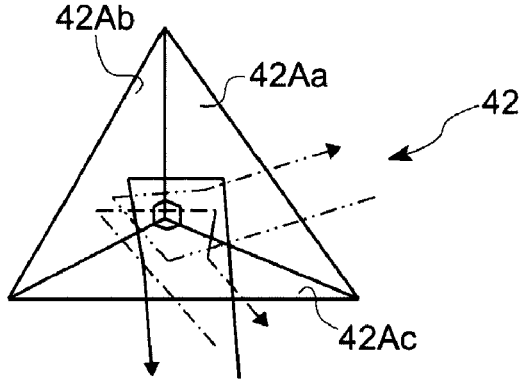
Figure 12:
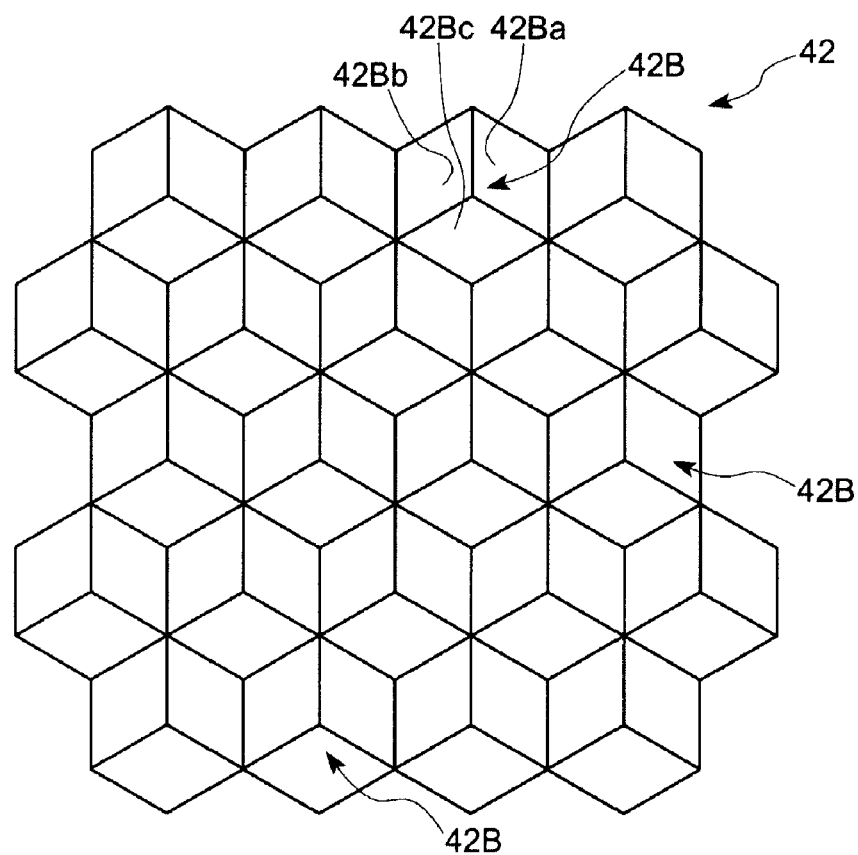
FIG. 12 is a drawing showing schematically another configuration of the retroreflector array of the real mirror imaging optical system applicable for the third embodiment of the present invention.
Figure 12:
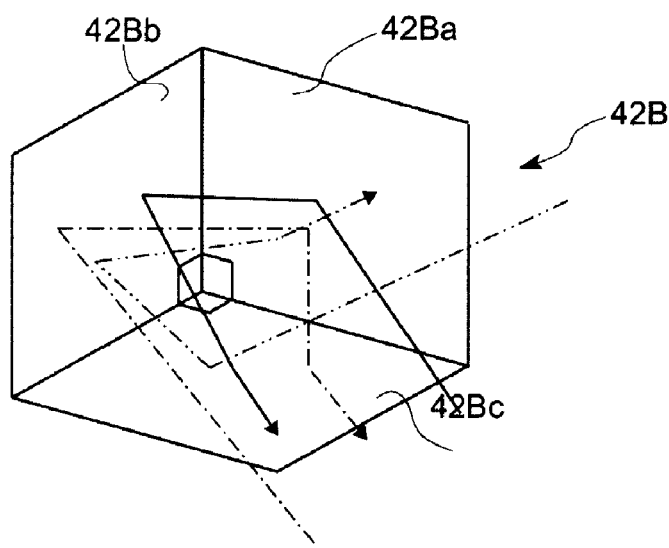

On the other hand, for the retroreflector array 42 any device might be used so far as they can precisely reflect back light in the reverse direction, thus for instance retroreflective coatings or retroreflective paints might be used on the surface of a board. Furthermore, in the present embodiment a flat device is used for the retroreflector array 42, but it is possible to use curved surfaces too. For instance, the retroreflector array 42, with a detail of the plane drawing shown enlarged in FIG. 11(*a*), is as a corner cube array, consisting of a set of corner cubes, made of shapes of one corner of a cube. Each retroreflector 42A consists of three specular surfaces 42Aa, 42Ab and 42Ac, of identically shaped isosceles right triangles of identical size, so that when one of their tips is connected together and viewed from the front, they form an equilateral triangle; and the three specular surfaces 42Aa, 42Ab and 42Ac are pairwise orthogonal and together form a corner cube. Furthermore, the retroreflector array 42 with its plane drawing shown enlarged in FIG. 12(*a*), is also a corner cube array, consisting of a set of corner cubes, made of shapes of one corner of a cube. Each retroreflector 42B consists of three specular surfaces 42Ba, 42Bb and 42Bc, of identically shaped squares of identical size, so that when one of their tips is connected together and viewed from the front, they form an equilateral hexangle, and the three specular surfaces 42Aa, 42Ab and 42Ac are pairwise orthogonal. The retroreflector array 42 differs only in shape from the retroreflector array 42 shown in FIG. 12(*a*) but its principle of recursive reflection is identical. Taking FIG. 11(*b*) and FIG. 12(*b*) as examples to explain the retroreflector array 42 shown in FIG. 11(*a*) and FIG. 12(*a*), as light arrives at one of the specular surfaces of the retroreflector 42A and 42B (for instance, at 42Aa and 42Ba), it will be reflected in sequence to another specular surface (42Ab and 42Bb), then again to still another specular surface (42Ac and 42Bc), thereby getting reflected back in the same direction from where it arrived. It should be noted that the arriving direction and the departing direction of light paths at the retroreflector array 42 are strictly speaking not overlapping but parallel; however, as far as the dimensions of the retroreflectors 42A and 42B are sufficiently small compared with the dimensions of the retroreflector array 42, for practical purposes the arriving and departing directions of the light paths could be deemed overlapping. The difference of the above-mentioned two types of corner cube arrays is that while the case of specular surfaces shaped like isosceles right triangles is slightly easier to manufacture, it has slightly weaker retroreflecting capability; on the other hand, with specular surfaces shaped like squares, it is slightly more difficult to manufacture, but it has somewhat higher retroreflecting capability.

Figure 13:
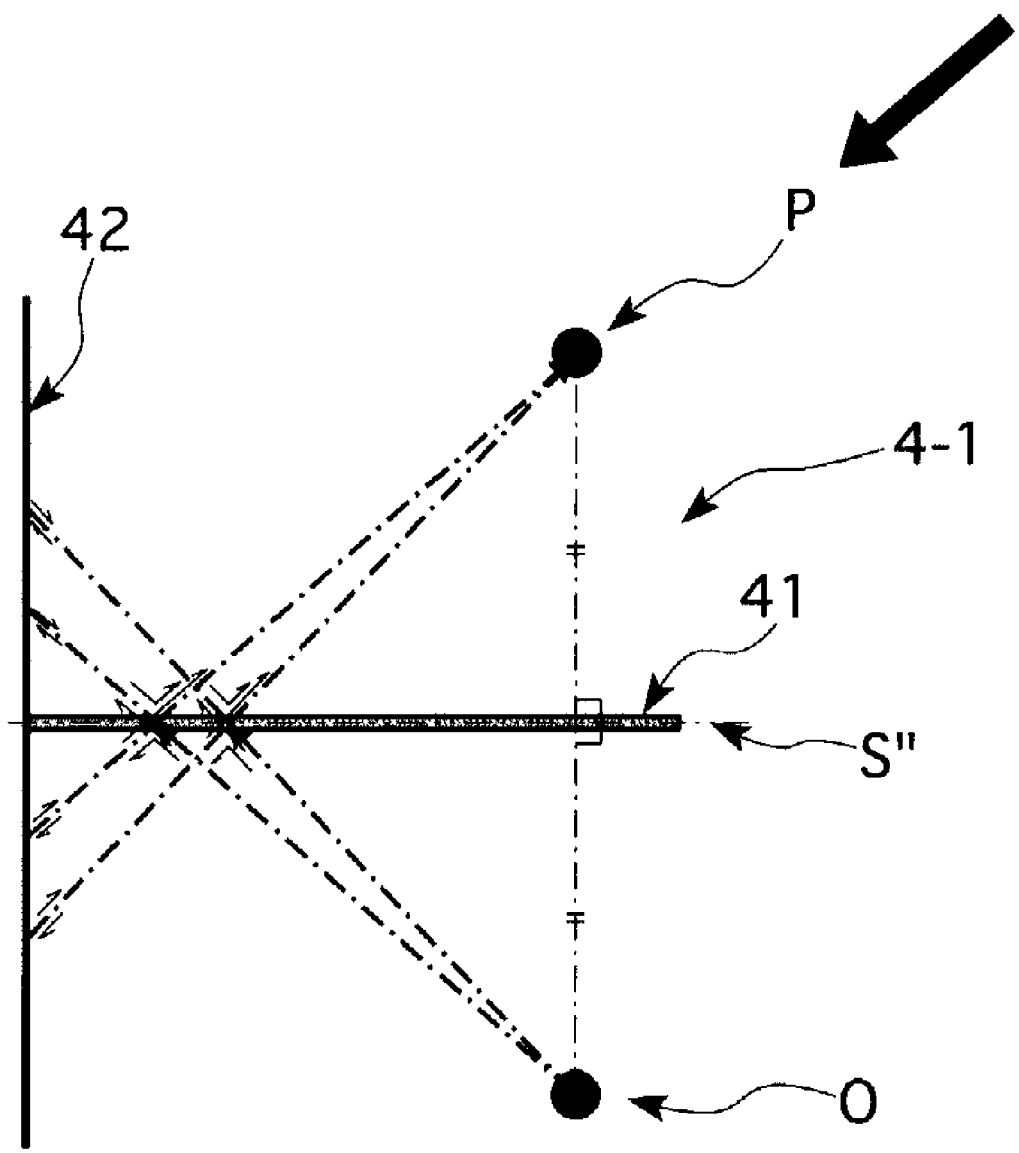
FIG. 13 is a drawing showing schematically the principle of the imaging process of the real mirror imaging optical system applicable for the third embodiment of the present invention.

In FIG. 13, the principle of image forming of the imaging optical system 4 used for the present embodiment is shown schematically by a side view of the reflection and transmission process of the light rays. The imaging optical system 4 has the half-mirror 41 arranged horizontally, whereas at one end of the half-mirror 41 (the end opposite to the observing direction) vertically underneath the half-mirror surface S", a retroreflector array 42 is placed in a vertical orientation, wherefore the half-mirror 41 and the retroreflector array 42 are at nearly perpendicular to each other. Firstly, light being emitted into all directions from the object to be projected O (in the drawing shown as a point light source) are going to be reflected from the half-mirror surface S" of the half-mirror 41, then get reflected in the reverse direction from the retroreflector array 42, further on get transmitted through the half-mirror surface S", therefore passing through one point in the space above the half-mirror 41, thus being focused again into one point. Thus the above-mentioned focusing is interpreted as an imaging process. The above-mentioned focus point is at a planar symmetric location to the object to be projected O with respect to the half-mirror surface S". On the other hand, in case the retroreflector array 42 is located above the half-mirror 41, the light emitted to all directions from the object to be projected O will pass through the half-mirror 41 in a straight line and will be reflected back by the retroreflector array 42, then by being reflected by the half-mirror 41, it will form an image in a point in the space above the half-mirror 41. In other words, light rays progressing along any of the above-mentioned paths will be passing through the point that is in a planar symmetric position to the object to be projected O with respect to the half-mirror 41 (more precisely, to the half-mirror surface S"), thus the real image P will be jointly formed in the same position, and it will be observable from a given position. The brightness of the real image P relative to the object to be projected O (the aperture of the light rays) can be obtained as the product of the three values of the 'half-mirror aperture', the 'half-mirror reflectivity', and the 'corner cube reflectivity' along each light path. Assuming as an ideal case that the 'half-mirror aperture' and the 'half-mirror reflectivity' are both 0.5, and the 'corner cube reflectivity' is r, then the aperture for the real image P due to either one of the light paths will be 0.25r, and the total aperture for the case when both light paths L1 and L2 contribute to P will be 0.5r.

In the transmission optical system 1D of the present embodiment, as shown in FIG. 10, for each half-mirror 41 of each real mirror imaging optical device 4 the same kind of device can be used, and the half-mirror surfaces S" that are symmetry surfaces are arranged parallel to each other. Furthermore, it is possible to adjust these half-mirror surfaces S" into attitudes either parallel or non-parallel to each other in the same way like in case of the second embodiment, and also similarly it is possible to equip them with an angle adjusting means for that end. As for the retroreflector array 42, so far as it is placed in a position where the light rays emitted from the object to be projected O and transmitted through the half-mirror 41, or where the light rays emitted from the object to be projected O and reflected by the half-mirror 41, or where both of those light rays can hit it, there need to be no restrictions on its placement or shape. For the present embodiment as one example, for the real mirror imaging optical system 4-1 that is first counting from the object to be projected O the retroreflector array 42 is placed overlappingly both over and under the half-mirror 41; while for the real mirror imaging optical system 4-2 that is second counting from the object to be projected O the retroreflector array 42 is placed only under the half-mirror 41. The features of each of these real mirror imaging optical systems 4 are the same, irrespective of how the retroreflector arrays 42 are positioned. However, in case of a real mirror imaging optical system 4 with the retroreflector array 42 placed only to one of the upper or lower sides of the half-mirror 41, the intensity of the real image will be half of that when compared with the case of placing it overlappingly both over and under the half-mirror 41. Furthermore, for the above-mentioned two real mirror imaging optical systems 4, all the retroreflector arrays 42 might be arranged in the same configuration with respect to the half-mirrors 41, or alternately all the retroreflector arrays 42 might be arranged in different configurations with respect to the half-mirrors 41. As an example, the retroreflector array 42 might be made in a tubular form, and at some appropriate intervals half-mirrors 41 might be positioned, subdividing the tube.

In case of the transmission optical system 1D with the above construction, first the light emitted from the object to be projected O will be reflected from the half-mirror surface S" of the first real mirror imaging optical system 4-1 that is the real mirror imaging optical system closest to the object to be projected O and recursively reflected from the retroreflector array 42 that is located under the half-mirror surface S", then that light is transmitted through the half-mirror surface S", forming the real image P1 at a planar symmetric position to the object to be projected O with respect to the half-mirror surface S"; at the same time, it will be transmitted through the half-mirror surface S" and recursively reflected from the retroreflector array 42 that is located over the half-mirror surface S", then that light is reflected from the half-mirror surface S", forming the real image P1 at the same position. The convex and concave features of this real image P1 will be reversed when compared to the object to be projected O. Similarly to the case of the first embodiment, the distance of the two real mirror imaging optical systems 4-1 and 4-2 is set to such a value so the position where the real image P1 is formed will be between the half-mirror surface S" of the first real mirror imaging optical system 4-1 and the half-mirror surface S" of the second real mirror imaging optical system 4-2. Next, the light emitted from that real image P1 serving as the object to be projected, will be reflected at the half-mirror surface S" of the second real mirror imaging optical system 4-2, then recursively reflected from the retroreflector array 42 that is located under the half-mirror surface S", then that light is transmitted through the half-mirror surface S", forming the real image P2 at a planar symmetric position to the real image P1 with respect to the half-mirror surface S". Since the convex and concave features of this real image P2 will be reversed as compared with the convex and concave features of the real image P1, they will be identical with those of the object to be projected O. Therefore it becomes possible to observe a real image P2 with its convex and concave features not being reversed from those of the object to be projected O.

In this way, in the case of the transmission optical system 1D using a plurality of real mirror imaging optical systems 4 composed of half-mirrors 41 and retroreflector arrays 42, similarly to the case of the transmission optical system 1A using a plurality of dihedral corner reflector arrays 3 as real mirror imaging optical systems 4, the real image P of the object to be projected O can be projected to a spatially distant location. Furthermore, in case of using three or more real mirror imaging optical systems 4, similarly to for example the case of the first embodiment, when the total number of the real mirror imaging optical systems 4 is an even number, the observed real image P will have its convex and concave features identical to the convex and concave features of the object to be projected O, while when that number is odd, the observed real image P will have its convex and concave features reversed as compared with the convex and concave features of the object to be projected O. Furthermore, by adjusting the angle between pairs of adjacent half-mirror surfaces S" to some tilted angle different from parallel, an effect similar to the case of the second embodiment might be obtained.

Figure 14:
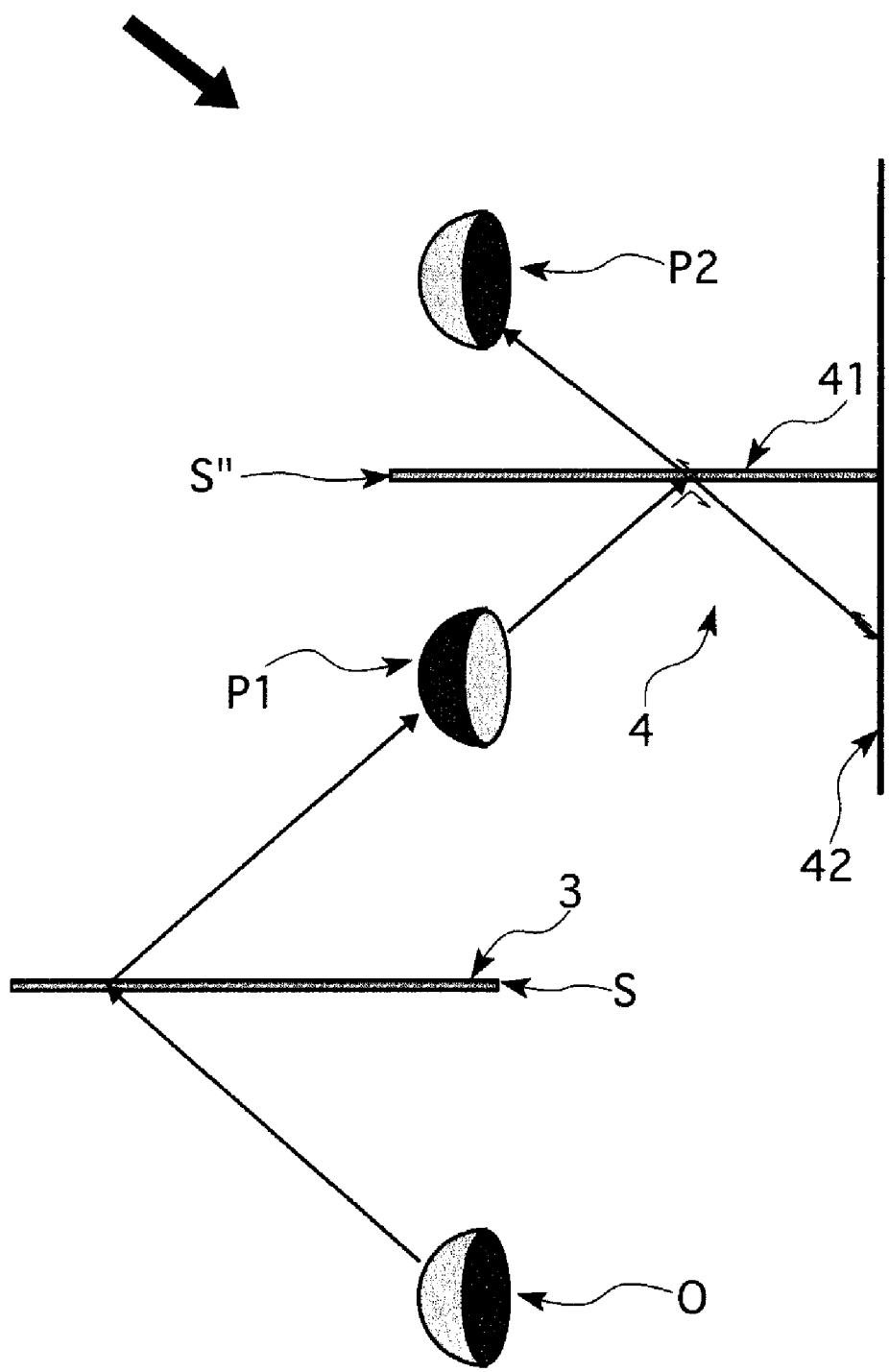
FIG. 14 is a side view drawing showing schematically one configuration of the transmission optical system constructed from several different types of imaging optical systems applicable for another embodiment of the present invention.

Furthermore, it is possible for the transmission optical system of the present invention to apply for instance the dihedral corner reflector array 3 of the first embodiment and the real mirror imaging optical system 4 of the third embodiment combined for the imaging optical system. For instance, in the transmission optical system 1E shown in FIG. 14 for the first imaging optical system closest to the object to be projected O a dihedral corner reflector array 3 is used, while for the second imaging optical system near to the observation side a real mirror imaging optical system 4 is used. In such a case too, first the light emitted from the object to be projected O will be reflected once each on each of the specular surfaces 21 and 22 of the dihedral corner reflectors 2 of the dihedral corner reflector array 3 for a total of two reflections, thus getting bent while being transmitted through the optical device plane S, and forming the real image P1 in a planar symmetric position to the object to be projected O with respect to the optical device plane S. Next, the light emitted from that real image P1 will be reflected at the half-mirror 41 of the real mirror imaging optical system 4, then recursively reflected from the retroreflector array 42, then that light is transmitted in a straight line through the half-mirror 41, while at the same time it will also be transmitted through the half-mirror 41, recursively reflected from the retroreflector array 42, and reflected at the half-mirror 41, forming the real image of the real image P1 at a planar symmetric position with respect to the half-mirror surface S". In this way, even in the case of transmission optical systems with several different types of imaging optical systems used together, the real image of the object to be projected O can be formed successively at each planar symmetric location with respect to the symmetry surfaces (optical device plane S, or half-mirror surface S"). Similarly it will also be possible to increase the number of imaging optical systems in a transmission optical system to three or more, or to adjust the angle between adjacent symmetry surfaces to a tilted angle.

Figure 15:
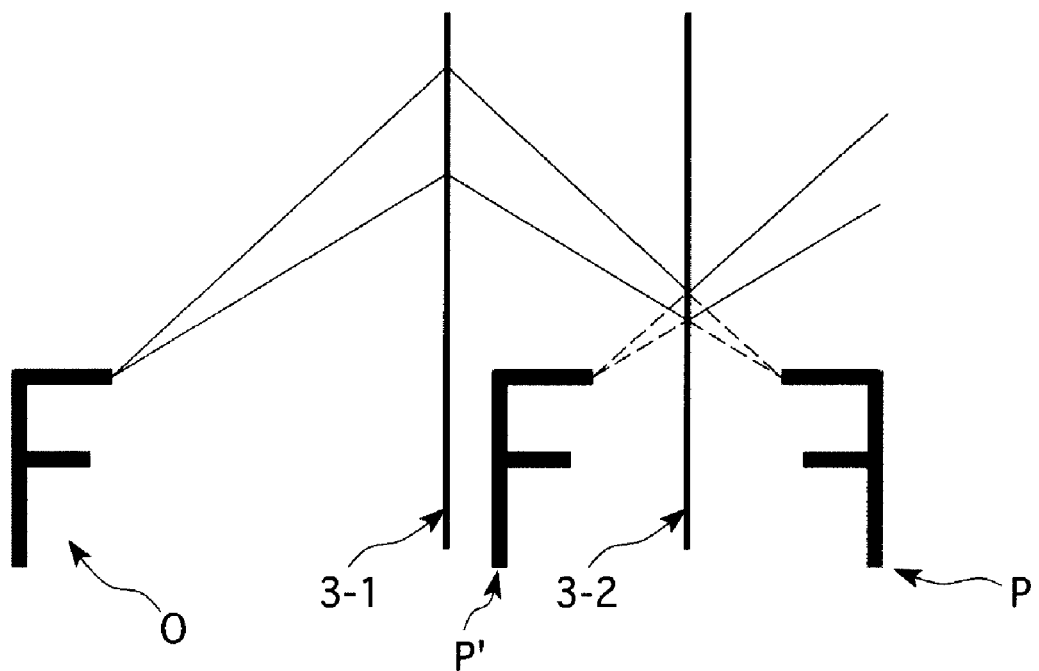
FIG. 15 is a side view drawing showing the outline of transmission by virtual images applicable for the transmission optical system of the first embodiment of the present invention.

Furthermore, for the imaging optical system used in the transmission optical system, in place of the above-mentioned real mirror imaging optical systems using micromirrors, it is also possible to use real mirror imaging optical systems with microlenses, or different types of imaging optical systems might be combined. Moreover, in case the imaging optical system is not a real mirror imaging optical system, although three-dimensional objects will appear distorted, when this is permissible, such systems might also be applied. Furthermore, although in each of the above preferred embodiments there was always a real image being formed between the imaging optical systems, nevertheless as shown in FIG. 15 for the case of using dihedral corner reflector arrays for the imaging optical systems, by making the gap between the adjacent imaging optical systems 3-1 and 3-2 narrow, and thus positioning the imaging optical system 3-2 closer than the position of the real image P1, the object to be projected O (in the drawing indicated by the letter 'F') will be transferred as a virtual image P', thus even if such a configuration appears as an intermediate stage of a multi-stage transmission, it has no effect on the overall transmission. The above effect will be the same in the case of using imaging optical systems composed of afocal lens arrays, or imaging optical systems using half-mirrors and retroreflector arrays. Furthermore, we note that details of the components are not restricted to the examples shown in the exemplary embodiments above, but might be determined in many similar ways in accordance with the essence of the present invention.

INDUSTRIAL APPLICABILITY

The transmission optical system of the present invention is capable of transmitting the real image of the object to be projected to a spatially distant location irrespective of whether that object is two-dimensional or three-dimensional, by sequentially forming planar symmetric images across each symmetry surface of each of a plurality of imaging optical systems, thus it is applicable for instance in three-dimensional endoscopes, in new kinds of display devices, or other such image (video) devices or observation devices.

I claim:

1. A transmission optical system, comprising:
   a plurality of imaging optical systems, each having an optical device plane,
   wherein light paths of light passing through said optical device plane are bent,
   wherein an object to be projected or its image is placed in front of one side of the optical device plane, whose image is projected as an image at the other side of the optical device plane in a plane symmetric manner with respect to the optical device plane,
   wherein said plurality of imaging optical systems are arranged with distances with each other,
   wherein at least one adjacent pair of said imaging optical systems are arranged in a non-parallel manner.

2. A transmission optical system according to claim 1, wherein at least one of said imaging optical systems has a plurality of unit optical elements equipped with at least one specular surface capable of reflecting light and arranged perpendicularly or nearly perpendicularly to said optical device plane of said imaging optical system.

3. A transmission optical system according to claim 2, wherein said unit optical elements are realized by two mutually perpendicular specular surfaces constituting a dihedral corner reflector, whereas a plurality of said dihedral corner reflectors forms a dihedral corner reflector array.

4. A transmission optical system according to claim 1, wherein at least one said imaging optical system comprises a half-mirror equipped with a half-mirror surface serving as said optical device plane, and a retroreflective device comprising of a set of unit recursively reflective optical elements arranged in a position to recursively reflect light reflected from or transmitted through said half-mirror.

5. A transmission optical system according to claim 1, wherein at least one of said imaging optical systems is equipped with a means to adjust the angle of its optical device plane with respect to the optical device plane of an adjacent imaging optical system.

6. A transmission optical system according to claim 1, wherein the number of said imaging optical systems is an even number.

7. A transmission optical system according to claim 1, wherein the number of said imaging optical systems is an odd number.

* * * * *